Patented June 16, 1953

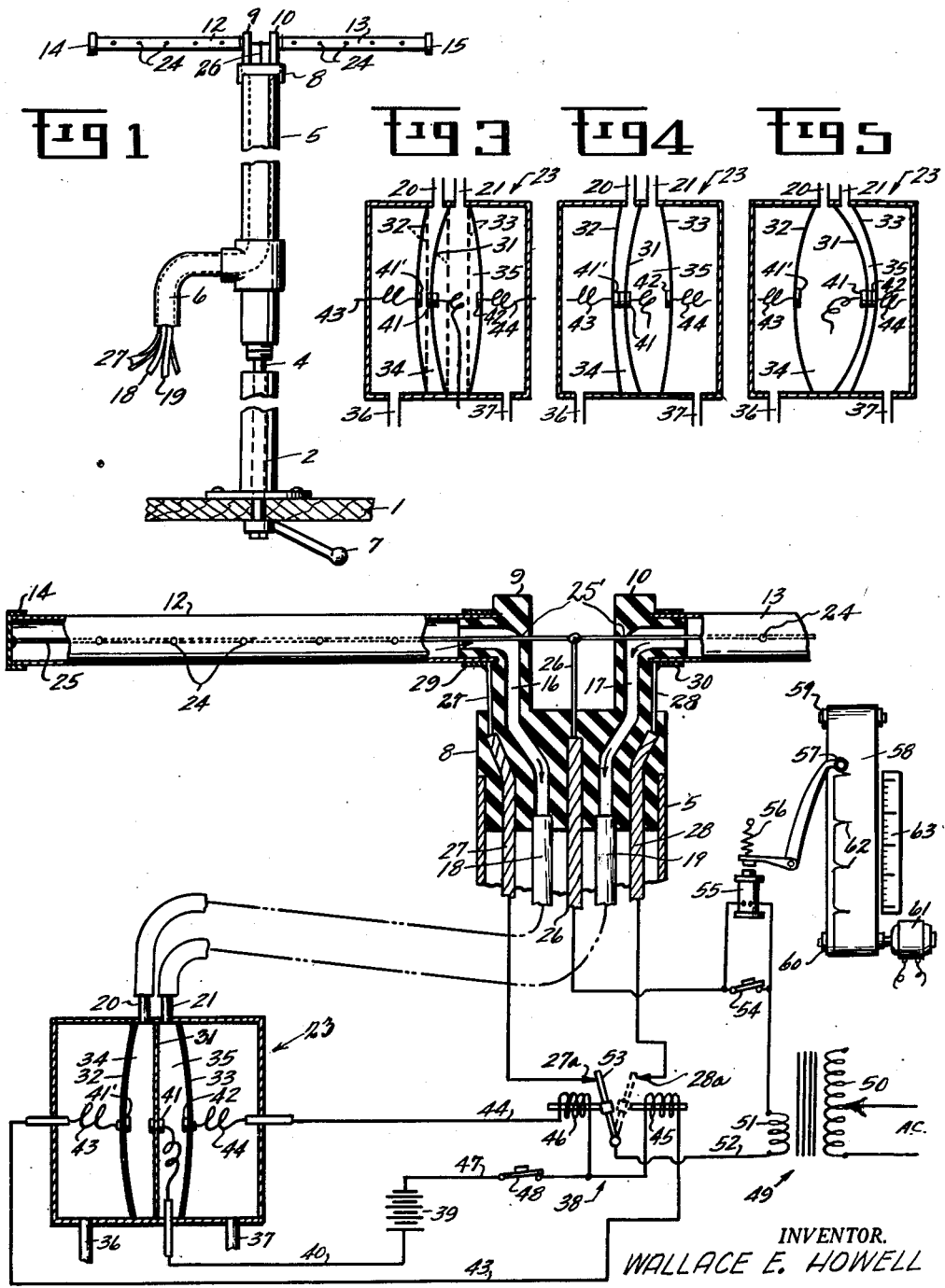

2,641,928

UNITED STATES PATENT OFFICE 2,641,928

ICING CONDITION INDICATING MEANS

Wallace E. Howell, Lexington, Mass., assignor to the United States of America as represented by the Secretary of the Air Force Application October 18, 1949, Serial No. 121,992

7 Claims. (Cl. 73—170)

This invention relates to meteorological apparatus and more particularly to instruments for indicating atmospheric icing conditions, particularly relative to aircraft operation.

In most of the icing condition indicating instruments for aircraft which are known or in use today, no icing indicating instrument or device is known which is continuously, immediately and uniformly operable at all times to determine and indicate the existing icing conditions and the severity of the conditions through a prolonged period of time. The prior known devices will function to determine that icing conditions exist but do not analyze or indicate accurately either the extent, or the rate, or severity of the icing conditions, or substantially the immediate termination thereof.

The present invention, on the other hand, not only determines and indicates the immediate existence of any atmospheric or meteorological icing conditions automatically at all times, but also indicates the extent and severity of these icing conditions and substantially the termination of these icing conditions.

My improved indicator device comprises two or more atmospheric icing determining members which are cooperatively arranged relative to each other to be alternately subjected to the icing conditions of the atmosphere, being automatically operable to indicate icing conditions if, and when they exist, and are alternately de-iced automatically and conditioned for subsequent automatically initiated subjection to the atmospheric conditions, to indicate present icing or non-conditions at all times, in which the rate of alternate icing and de-icing is a functon of the extent and severity of the icing conditions.

In carrying out the invention, each of a plurality of icing determining members is subjected to the icing conditions alternately, or successively if more than two, each of the members having the provision of means for heating the same to thaw or de-ice the same at a substantially uniform rate, which may be varied, to quickly condition the same for subsequent initiation to the icing conditions, including means operable as a result of the alternate icing and thawing operations of the members for subjecting the thawed out members to the icing conditions successively, then heating, thawing and reconditioning the iced members successively at a rate which is a function of the extent and severity of the icing conditions, including means for automatically discontinuing the successive heating and reconditioning of the icing determining members upon the termination of the icing conditions.

An object of the invention therefor is the provision of a plurality of operatively associated icing determining members for determining the immediate existing atmospheric icing conditions including means for independently conditioning each of them so as to be operative to determine icing conditions, together with icing condition indicating means alternately operable under the control of each of the icing determining members when the members are rendered substantially inoperative by icing conditions to automatically and simultaneously subject another of the members which has been conditioned for icing, to the icing conditions having means operable thereby at a predetermined ratio to the alternate operation of the members for determining the rate or severity of the icing conditions.

A further object of the invention is the provision of a plurality of icing determining members, each exposed to the atmospheric icing conditions, including separate electric heating circuits for each member to thaw the same following icing thereof to condition the same for continuing or subsequent icing determining conditions, including an icing condition indicator which is alternately connectable to each of the icing determining members and operable thereby to close the heating circuits for the icing determining members alternately upon predetermined exposure of each of the members to the atmosphere when predetermined icing conditions are present and simultaneously open the heating circuit to another icing determining member of the group to render the last mentioned member subject to icing conditions, in which the rate of alternate heating and exposure of the icing determining members determines the rate and severity of the icing condition substantially continuously throughout the extent of the conditions.

Other objects and advantages of the invention will become apparent from the following description taken in connection with the accompanying drawings in which like reference characters refer to like parts in the several figures.

Fig. 1 is a side elevation of the icing conditioning determining members and supporting standard or mounting therefor and the means for adjusting the same in azimuth, parts being broken away and shown in section.

Fig. 2 is an enlarged fragmentary view, parts being broken away and in section, illustrating the detail structure of the icing condition determining head and differential pressure control device, together with the triple diaphragm when icing is not present but when there is some wind velocity, the controlling circuits, relays, heating circuits, and recording means being illustrated somewhat diagrammatically.

Fig. 3 is a view of the triple diaphragm differential pressure control switch device for controlling the actuation of the dual heating circuits, the dotted lines illustrate the positions of the diaphragms when there is no icing conditions present and no velocity of air relatively passing the icing determining members.

Fig. 4 is a diagrammatic view similar to Fig. 3 but illustrating the positions of the diaphragms at the end of one cycle of operation, when the apertures in one icing determining members are iced over, at the instant when heating circuit to the iced over member is energized.

Fig. 5 is a view similar to Figs. 3 and 4, illustrating the position of the triple diaphragms and contacts at the end of a second cycle during icing condition, and when the relative wind velocity is greater.

Referring to Fig. 1 the reference numeral 1 denotes a support, such as the roof of a cabin, or building, or of an aircraft, having a tubular flanged bracket 2 secured to the top surface thereof, through which extends a vertical standard or rod 4 to the upper end of which is secured a tubular shell member 5 having a laterally and downwardly extending tubular portion 6. The lower end of the rod 4 extends through and below the roof 1, as shown in the drawings, and is rotatably mounted in the tubular bracket 2, an adjusting handle 7 being fixed thereon for adjusting the standard about its axis. Other mechanical or electrical means may be substituted for rotatably adjusting the supporting standard on its axis if desired.

Fixed in the upper end of the tubular member 5 is a supporting block or plug 8 formed of insulating material such as "bakelite," and best seen in Fig. 2. The block 8 is firmly secured in the upper end of the tubular member 5 and is formed with a pair of laterally spaced upwardly extending parallel ears 9, 10 having opposite parallel exterior faces. A pair of metallic tubular icing condition determining members 12 and 13 project laterally in opposite directions from the remote sides of the two upstanding ears 9 and 10, the tubular members being closed at their outer ends by end closures or metallic caps 14 and 15. The ears 9 and 10 and the interior of the block 8 are formed with a pair of air conducting passages 16 and 17 therethrough, disposed in communication at their upper ends with the interior of the tubular members 12 and 13 and connected at their lower ends with flexible conductors or tubes 18 and 19 which extend downwardly through the vertical pipe or shell 5, then laterally and downwardly through the pipe 6, and then preferably below the roof and are connected to two nipples 20 and 21 projecting from a triple diaphragm differential pressure switch control device 23, later described.

Each of the tubular members 12 and 13 is formed with a single row of small apertures 24 located preferably on a horizontal plane passing through the axis of the tubes 12 and 13 on the windward side thereof.

An electrical conductor 25 is connected at its opposite ends to the centers of the caps 14 and 15, and extends axially through the icing condition determining tubes or members and through small openings 25' in the ears 9 and 10 just of sufficient size to receive the conductor. The conductor 25 forms a part of a pair of heating circuits having a common feed conductor 26 which connects the conductor 25 at a point intermediate the ears 9 and 10 and extends downwardly through the plug 8, and shell 5, and out through the pipe 6. Electrical conductors 27 and 28 for the two heating circuits are connected at 29 and 30 to the inner ends of the tubes 12 and 13 respectively, passing to the exterior through the plug 8, shell 5 and pipe 6, as shown in the drawings.

The icing condition determining members 12 and 13 are made of very thin stainless steel and are adjusted to be held perpendicular to the wind direction with the small holes 24 disposed along the windward stagnation line of the air flow so that when no ice is present the dynamic pressure of the wind is communicated to the interior of the tubes and thence through the flexible connecting tubes 18 and 19 to the triple diaphragm differential pressure switch 23. Heating of the tubes 12 and 13 is accomplished by the resistance or impedance of the tube between the connections thereto, at 14, 29 and 30, of the electrical conductors 25 and 27, and therefor the tube diameter, length and thickness is important. The pick-up head, which includes the two tubes 12 and 13, is so designed so that the heat capacity of each tube is very small and the conduction of heat from one tube to the other is very slight. For example, the tubes may measure approximately 1 cm. in diameter by 20 cm. in length and have a wall thickness of less than 0.15 mm., making the electrical resistance of each, about 0.05 ohm. The power supply is designed to provide about 0.6 watt of energy for each cm.$^2$ of projected area of the tube to provide some reserve beyond a predetermined 0.5 watt/cm.$^2$ requirement such as established by Schaefer for ice protection of small instruments. Conduction of heat from one tube to the other is diminished by the end spacing of the tubes and the mounting thereof on the spaced "bakelite" ears.

The differential pressure device 23 comprises a closed casing having a central diaphragm 31 and a pair of parallel adjacent diaphragms 32 and 33, spaced from the diaphragm 31 at opposite sides thereof dividing the casing into opposing fluid pressure chambers 34 and 35 at opposite sides of the diaphragm 31. The nipples 20 and 21 lead respectively into these fluid pressure chambers 34 and 35. The casing is provided with small bleed apertures 36—37 allowing the pressure in the ends of the casing, exteriorly of the diaphragms 32 and 33 to slowly escape out of the casing.

The differential pressure switch device 23 controls the two heating circuits alternately through an electromagnetic control device or relay 38. A source of electrical energy or battery is indicated at 39 having a conductor 40 leading from one terminal thereof to an electrical contact 41 on the center of the diaphragm 31. The other two diaphragms 32 and 33 have cooperating contacts 41' and 42 with flexible conductors 43 and 44 leading therefrom through the opposite ends of the casing to one terminal of each of the relay magnets 45 and 46. The other terminals of the relay magnets 45 and 46 are connected to a common conductor 47, having a switch 48 therein, and connected to the other terminal of the battery 39. The reference numeral 49 denotes a transformer having a variable primary circuit 50, and a secondary 51 which is connected at one side through a conductor 52 to the pivot end of the relay armature 53, arranged to contact either of the terminals 27ᵃ or 28ᵃ for the de-icing heating circuits 27 and 28. The other terminal of the secondary 51 is connected through a switch 54 to the common electrical conductor 26 of the heating circuits. An electrical impulse recorder such as indicated at 55 may be included in a bridge circuit across the terminals of the switch 54 so that when the switch is opened the recorder 55 is introduced in the heating circuit. The recorder 55 may be any of many conventional well known types to record an impulse on a tape when a change is made from one heating circuit to the other. In the form shown, when either of the heating circuits are energized (with the switch 54 open) the magnet holds the armature attracted and tensioned against a spring 56 so that the scriber 57 makes a graphic record or line on the left side of a paper tape 58 which is advanced uniformly between spaced supply and take up reels 59 and 60 driven by a constant speed motor 61.

Each time one heating circuit is broken the armature is released and the spring 56 rocks the scriber arm to the right making a check indication, as at 62 on the tape 58. The spacing between the checks 62, as determined by a reference scale 63 denotes the rate of alternation of the operation of the two heating circuits, and therefore the degree of severity of the icing conditions.

The primary 50 of the transformer 49 is adjustable to regulate the electrical input of the heating circuits for initially setting the icing indicating apparatus for predetermined atmospheric and barometric pressure conditions.

In the operation the electrical input in the heating circuits is adjusted, through the variable auto transformer 49 at a heating value sufficient to prevent the formation of ice on the icing determining member or tube being heated while the other non-heated tube takes on the temperature of the ambient air. As long as no icing condition exists, the same total air pressure is communicated through the conduits 18 and 19 to the two chambers 34 and 35 of the triple diaphragm switch device 23 and, according to the degree of wind pressure, the two diaphragms 32 and 33 will be equally displaced from the intermediate diaphragm 31 as shown in Fig. 2. If no wind velocity is present the diaphragms will be positioned as shown in dotted lines in Fig. 3, all contacts however being out of contacting relation.

When icing begins, ice accumulates on the cold tube (tube 13 in Fig. 2) and blocks the holes 24 therein, preventing air dynamic pressure from being communicated to the interior of the tube. The other tube is of course being heated and no icing occurs thereon until its heating circuit is opened. The air pressure in the unheated tube 13 and the connected chamber 35 of the switch 23 which displaced the diaphragms 31 and 33 away from each other is reduced, pressure or reduction of pressure between the ends of the switch casing is relieved through the bleed openings 37 and the diaphragm 33 collapses toward a plane position and the central diaphragm 31 since the dynamic pressure of the air is still exerted through the heated tube member 12 on the other side of central diaphragm 31 between this diaphragm and diaphragm 32, diaphragm 31 is moved toward diaphragm 33 closing the contacts 41 and 42 on diaphragms 31 and 33. Closing of these contacts operates the relay 38 to the dotted position in Fig. 2, closing the heating circuit to the tube 13 which has been collecting ice, heating it and ridding it of ice, while the other tube heating circuit to tube 12 is simultaneously and automatically interrupted, allowing tube 12 to take on the temperature of the ambient air and begin to collect ice. A similar one-half cycle of operation returns the instrument to its original condition shown in full lines in Fig. 2. The heating circuits are automatically closed alternately, the rate being recorded by the recorder 57 which makes a check 62 on the moving tape 58 each time the heating circuits are alternately energized or changed and the spacing between checks 62 denotes the intensity of the icing conditions. The plural heating circuits are operated alternately or in succession under variable wind conditions, for instance at low wind velocities as shown in Fig. 4, the two outer diaphragms 32 and 33 are but little displaced and a very small air pressure differential introduced in the chambers 34 and 35 is required to close one or the other of the switch contacts 41', 41 or 41, 42 on the diaphragms. As the wind increases, a condition as shown in Fig. 5 exists, the outer diaphragms 32 and 33 being forced farther apart and a greater air pressure differential is required to operate the switch. The instant when the electrical contact is made to operate the icing condition determining member, the heating circuit controlling relay 38 is thus not affected by sudden gusts of wind or other disturbing influences.

Having thus described my invention, what I claim as new and desire to secure by Letters Patent is:

1. In a meteorological icing condition indicating apparatus, icing condition indicating means comprising a pair of tubular icing condition determining members, each closed at one end and formed with a plurality of small apertures therethrough intermediate their ends for admitting air therethrough and adapted to be restricted by ice during icing conditions, a diaphragm casing, a diaphragm extending across the casing intermediate the ends thereof to form two pressure chambers, one at each side of the diaphragm, a pair of fluid pressure conduits one conduit being in communication with one pressure chamber and the interior of one of the tubular icing condition determining members and the other conduit in communication with the other pressure chamber and the interior of the other tubular icing condition determining member, an independent heating circuit for heating each tubular member to remove ice formed thereon tending to close said apertures, switch means movable to energize one or the other of the heating circuits, actuating means for moving said switch means, means operable by selective movement of the diaphragm in one direction or the other for operating the actuating means to selectively actuate the switch means for selectively closing one heating circuit or the other whereby the members are alternately heated to remove ice therefrom at a rate proportional to icing conditions, and indicating means responsive to said rate of alternation to indicate the severity of icing conditions.

2. In a meteorological icing condition indicator, a pair of meteorological icing condition determining members each comprising a closed tubular casing having an air inlet aperture therein of predetermined size for the passage of atmospheric air therethrough, adapted to be closed by the formation of ice thereon during icing conditions, separate heating means for independently removing ice formations from each of said members during atmospheric icing conditions, differential air pressure operated switch means connected to both of the closed tubular casings and alternately operable in one direction or the other by air entering through the apertures in one casing or the other for selectively operating said heating means of the other casing to remove ice alternately from each of said members upon accumulation of a predetermined amount of ice thereon restricting the passage of atmosphere air through the apertures, and icing condition indicating means connected to said switch means and operable by said switch means for indicating the rate of alternate heating of the casings to indicate the severity of icing conditions.

3. In a meteorological icing condition indicating instrument, a support, icing condition indicating means comprising a pair of finely apertured tubes carried by the support for simultaneous exposure to atmospheric icing conditions, electrical resistance heating means intermediate the ends of each tube including a pair of energizing circuits and a common switch means for alternately closing said energizing circuits to alternately energize the resistance heating means for each tube to heat the tubes alternately during atmospheric icing conditions to alternately remove the ice formed in the apertures of each tube, an air pressure operated device, including a diaphragm therein forming opposing pressure chambers at opposite sides of the diaphragm, and a pair of air delivery conduits, one conduit being connected between one chamber and the interior of one tube for receiving air passing through the tube apertures and delivering the same to the connected pressure chamber and the other conduit being connected to the other chamber and the interior of the other tube, electrical contact means operable by the diaphragm at opposite sides thereof incident to movement thereof in opposite directions, a pair of control circuits selectively controlled by said contact, means for alternately closing each of the control circuits incident to movement of the diaphragm in opposite directions, and electromagnetic means energizable by one or the other of said control circuits for actuating said switch means to close one or the other of the heating circuits incident to movement of the diaphragm in one direction or the other, electrically operable rate of icing indicating means connected to be actuated by said energizing circuit and means for regulating the electrical energy in said heating circuit to determine the rate at which the tubes are heated.

4. Apparatus as claimed in claim 3 in which the tubes are formed of thin wall electro-conductive metal having a predetermined electrical impedance, the tubes being connected at spaced longitudinal points in the heating circuit whereby the electrical resistance of the metal of the tubes in the heating circuit when the circuit is energized causes the tubes to be heated.

5. In a meteorological icing condition determining apparatus, a pair of elongated tubular casings each closed at one end and having an aperture therethrough of predetermined size for admitting atmospheric air thereinto, subject to icing during icing conditions for varying the operative area thereof, electrical resistance heating means for each casing for heating the same to remove ice therefrom, a closed diaphragm casing, diaphragm means therein intermediate the ends of the casing dividing the same into opposing pressure chambers, air bleed passage means through the ends of the diaphragm casing, a pair of air conduits, one air conduit in communication between one of the chambers and the interior of one of the tubular casings, and the other conduit being in communication between the other chamber and the interior of the other tubular casing, an electrical heating circuit for each of said resistance heating means, switch means for selectively controlling said heating circuits, movable in one direction to close and energize one heating circuit, and movable in another direction to close and energize the other heating circuit, means to vary the energy in at least one of the heating circuits, electromagnetic means for selectively actuating said switch means in each of the aforesaid directions including a pair of separate energizing circuits therefor, and electrical contact means in said energizing circuits, for selectively closing the last mentioned energizing circuits, operable by the diaphragm means incident to movement thereby toward one or the other ends of the diaphragm casing, for selectively closing one or the other of the last mentioned energizing circuits to actuate the heating circuits alternately at a predetermined ratio to the removal of the ice from the alternately heated tubular casings, and indicating means operable thereby for indicating icing conditions.

6. In an apparatus for indicating meteorological icing conditions, a support, a pair of tubular icing condition determining members subject to icing conditions when they exist, each tubular member having a thin metallic wall of predetermined cross sectional area and length to form a heating element of predetermined electrical impedance intermediate its ends, a heating circuit for each tubular member connected to the tubular member at longitudinally spaced points thereon, for heating each tubular member, each tubular member having a row of small apertures in the side thereof of predetermined size for receiving air therethrough and subject to icing over during icing conditions, movable switch means for the heating circuits, movable in one direction to close one circuit and open the other, and movable in another direction to close and open the heating circuits in an opposite manner, a differential pressure switch device comprising a closed casing, three diaphragms disposed across said casing in normally spaced parallel relation forming expendable pressure chambers at opposite sides of the intermediate diaphragm and a closed chamber between each end of the casing and the sides of the outer two diaphragms, air bleed passages leading from the closed chambers, a pair of air conductors, one conductor disposed in communication with the interior of one of the tubular members and one of the expendable chambers between the diaphragms for receiving air passing through the apertures in that tubular member and the other conductor connected between the interior of the other tubular member and the other expendable chamber, electromagnetic means at each side of the switch means for actuating the switch means in the aforesaid opposite directions, a pair of energizing circuits for said electromagnetic means including a circuit controlling contact on the intermediate diaphragm, means connecting this contact to one terminal of both of the electromagnetic means, a cooperating circuit controlling contact on each of the other two diaphragms, electrical conductor means between each of the remaining electric terminals of the electromagnetic means and each of the contacts on the two exterior diaphragms, regulatable means for regulating the electric potential in the heating circuits, and electrically operable icing indicating means including an energizing circuit therefor connected to the switch means and energized thereby for indicating the severity of icing conditions.

7. In a meteorological icing condition indicating apparatus, a support, a pair of separate icing condition determining members carried by the support in spaced relation to each other and each comprising an elongated apertured air collection tube subject to atmospheric icing conditions when they exist to close the tube, an independent heating circuit for each of said members for heating the same to remove ice formed thereon closing the apertures during icing conditions, circuit closing means movable in one direction to close one of the heating circuits and movable in another direction to close the other heating circuit, and differential air pressure actuated means having two air inlet conduits connected respectively to said two collection tubes selectively operable incident to icing conditions closing of the apertures on each of said icing condition determining tubes to actuate said circuit closing means to close the heating circuit to the other icing condition determining tube, and icing condition indicating means connected to both of the heating circuits to be alternately energized by each of the heating circuits to indicate the rate of alternately energization of the two heating circuits during icing conditions.

WALLACE E. HOWELL.

References Cited in the file of this patent

UNITED STATES PATENTS

| Number | Name | Date |
|---|---|---|
| 2,338,574 | Cunningham | Jan. 4, 1944 |
| 2,460,165 | Britton | Jan. 25, 1949 |
| 2,541,512 | Hahn | Feb. 13, 1951 |

FOREIGN PATENTS

| Number | Country | Date |
|---|---|---|
| 622,993 | Germany | Aug. 3, 1934 |
| 446,983 | Great Britain | May 11, 1936 |